United States Patent
Weldon, Jr. et al.

(10) Patent No.: US 6,415,242 B1
(45) Date of Patent: Jul. 2, 2002

(54) SYSTEM FOR WEIGHING FIXED WING AND ROTARY WING AIRCRAFT BY THE MEASUREMENT OF CROSS-AXIS FORCES

(75) Inventors: James Peter Weldon, Jr., North Hampton, NH (US); Marthinus C. van Schoor, Medford, MA (US)

(73) Assignee: Abnaki Information Systems, Inc., North Hampton, NH (US)

(*) Notice: Subject to any disclaimer, the term of this patent is extended or adjusted under 35 U.S.C. 154(b) by 0 days.

(21) Appl. No.: 09/360,138

(22) Filed: Jul. 23, 1999

(51) Int. Cl.[7] .............................................. G01G 19/00
(52) U.S. Cl. .................... 702/173; 702/101; 702/174; 73/1.08; 73/1.15
(58) Field of Search .................... 702/42, 101, 104, 702/173, 174; 177/25.12, 25.13, 25.14; 73/1.08, 1.13, 1.15

(56) References Cited

U.S. PATENT DOCUMENTS

| | | | | |
|---|---|---|---|---|
| 4,094,192 A | * | 6/1978 | Watson et al. | 73/1.15 |
| 4,143,724 A | * | 3/1979 | Itani | 702/173 |
| 4,967,384 A | * | 10/1990 | Molinar et al. | 702/174 |
| 5,490,427 A | * | 2/1996 | Yee et al. | 73/767 |
| 5,533,380 A | * | 7/1996 | Ferris | 73/1.08 |

* cited by examiner

*Primary Examiner*—Bryan Bui
(74) *Attorney, Agent, or Firm*—Choate, Hall & Stewart (57) ABSTRACT

Method and system for determining aircraft weight-related data. Strain sensors are affixed to aircraft support struts to generate signals related to strut strain. Tensioning apparatus applies known tension to the struts and computing apparatus calculates a calibration matrix relating loads to the strain sensor signals. The computer calculates the weight-related data from the calibration matrix and strain sensor signals.

12 Claims, 8 Drawing Sheets

SYSTEM FOR WEIGHING FIXED WING AND ROTARY WING AIRCRAFT BY THE MEASUREMENT OF CROSS-AXIS FORCES

BACKGROUND OF THE INVENTION

This invention relates to a system and method for determining aircraft weight-related data such as balance and weight.

Accurate aircraft load and balance information is crucial for safe and efficient aircraft operation. Federal regulation and good professional practice require that all private, military and commercial aircraft operators determine aircraft weight, weight distribution (balance), center of gravity, and aerodynamic center of lift before attempting flight.

Current commercial and military practice for calculating aircraft weight and balance is primarily an estimation process that is augmented by a few actual measurements. Aircraft Empty Operating Weight (EOW) is established by platform weighing at the time of aircraft manufacture or during periodic major maintenance. The EOW is then used as a base number for the daily operational practice of estimating gross aircraft operating and take-off weight. Cargo is generally weighed before being loaded on an aircraft. Cargo carriers operating from remote sites (tactical military transports, for example) have no platform scales available, and may be forced to estimate cargo weight. Other weight components (including aircraft balance), are estimated:

- Passenger weight is typically estimated by assigning an average value (180 lb./male, 130-lb./female passenger) to each passenger.
- Baggauge weight is estimated by assigning an average value to each piece, and then multiplying this average value by the total number of bags.
- Fuel weight is estimated by converting the measurement of total fuel volume in the aircraft fuel tanks, based on an average fuel density value, and fuel totalizers are accurate only within ±2–3% of actual fuel volume.
- Ground crew chiefs (or loadmasters) manually record the physical location on the aircraft where they loaded cargo and baggauge and then either submit this information to load agents for balance calculation or calculate aircraft weight distribution themselves by using manual (loading charts) or personal computer methods.
- Military fighter aircraft operators generally sum the manufacturer's advertised weight of the ordnance (missiles, bullets, bombs, electronic warfare pods, expendable fuel tanks, etc.) and add that number to EOW.
- Tactical military fixed wing and rotary wing transport operators generally estimate their load weights— especially when operating from unprepared fields or in combat conditions.

These weight estimation procedures are subject, to three types of error. The first is statistical error. For any estimation parameter, there is a built in statistical error margin: a certain percentage of weight estimates will be either too low (sacrificing safety) or too high (sacrificing aircraft carrying capacity). A second error source is passive human error: an individual gate agent, ground crew chief, loadmaster, dispatcher, load agent or ramp worker simply makes a mistake. A third type of error is cheating: an individual intentionally falsifies weight data. Instead of estimating aircraft weight and balance, there are two broad categories of systems which attempt to determine aircraft weight directly. Off-board systems make use of platform weighing in which the airplane is actually weighted. On-board systems typically measure changes in strut nitrogen or hydraulic pressures, or measure landing gear z-axis (vertical axis) shear and/or bending stress. U.S. Pat. Nos. 4,967,384 and 5,521,827 are directed to off-board weighing systems. On-board systems are described and claimed in U.S. Pat. Nos. 5,214,586; 5,540,108; 5,205,514; 5,257,756; 5,258,582; 4,507,742; 4,700,910; and 3,797,302. These patents typically use strain gauges or pressure transducers.

In order to accurately calculate aircraft weight using strain and/or pressure measurements, it is necessary to resolve all axial and cross-axial forces that act on an aircraft's structure. Prior art systems such as those set forth above that have attempted to measure aircraft weight by measuring z-axis bending or shearing strain in the aircraft landing gear, or by measuring changes in hydraulic or pneumatic pressure in landing gear struts have failed to achieve the desired accuracy and reliability. The reasons are as follows:

First, the structural components of aircraft landing gear struts are not axially, radially and materially symmetric. The design asymmetries in material thickness, material types, and shapes result in an asymmetric distribution of force throughout the landing gear strut. This asymmetric distribution of force is, in effect, a series of cross-axis forces. Prior art systems that measure one-dimensional strain or pressure variations fail to consider this cross-axis phenomenon.

A second problem with systems that attempt to calculate aircraft weight by making single point z-axis measurements of force is that they fail to consider the fact that the sensor's reference frame rotates or displaces (or both) as a result of changes in aircraft weight or as a result of aircraft movement. This bending of the aircraft landing gear under the strain of loading or movement creates, in effect, a series of cross-axis forces. The sensors that were-designed to sense z-axis bending in effect rotate, so as to be no longer oriented to the z-axis.

These asymmetries and cross-axis forces disappear when the weight measurement is made at the point at which the aircraft tires touch the ground. At that point, all the various components of force come together, so that when the aircraft is rolled onto a platform weighing scale, that scale measures the z-axis force exerted on the bottom of the aircraft's tires. But it is impractical to position weighting scales at airports for daily operational use.

SUMMARY OF THE INVENTION

In one aspect, the method of the invention for calculating aircraft weight-related data includes affixing strain sensors to aircraft structural supports and/or landing gear struts to generate signals related to strut strain. Known loads are applied to the struts to determine a calibration matrix relating loads to the strain sensor signals. Weight-related data are calculated from the calibration matrix. Weight-related data may be aircraft weight or aircraft balance information. In one embodiment, the known loads are produced by providing tension between pairs of struts to provide off-axis loads.

In another aspect, the system according to the invention for determining aircraft weight-related data includes strain sensors affixed to aircraft support struts to generate signals related to strut strain. Apparatus applies known tension to the struts and computing apparatus calculates a calibration matrix relating loads to the strain sensor signals. The computing apparatus also calculates the weight-related data from the calibration matrix. Temperature sensors and accelerometers may also be affixed to the aircraft support structure for use in calculating the calibration matrix. A flight management computer may be provided for receiving the weight-related data. In this system, the off-axis loads resolve cross-coupling effects of bending stress on the support struts.

The on-board aircraft weight and balance calculation system of the invention thus produces highly accurate aircraft weight and center of gravity information and communicates this information to flight crews, the aircraft flight management computer, and to ground-based computers. Strain, temperature and acceleration sensors placed throughout the aircraft measure aircraft structural response to changes in aircraft weight. The unique calibration procedure of the invention resolves cross-axis coupling effects that influence measurement of z-axis strain. The procedure applies auxiliary axial and cross-axial loads, records structural response to these loads and then includes these measurements with structural bending strain, temperature and acceleration data in a mathematical procedure that determines aircraft weight.

The highly accurate weight and balance information provided to air crews and aircraft operators by the methodology of the invention reduces or eliminates costs associated with inaccurate or wrong estimates. These costs include decreased safety margins and lost economic opportunity. Safety is especially affected. The National Transportation Safety Board (NTSB) states that numerous airline and general aviation accidents are caused by overweight conditions. Economics is also a consideration. Current weight and balance estimation practices are labor intensive and costly. "Awaiting load" delays cause missed connections, create passenger dissatisfaction, increase crew and fuel cost, sacrifice aircraft utilization, and waste perishable carrying capacity.

In contrast to the prior art, the present invention takes a systems-architecture approach to measuring bending strain and produces highly accurate and timely aircraft weight and center of gravity information. The invention positions groups of strain and temperature sensors throughout the aircraft structure in order to obtain independent information on aircraft structural response to horizontal, vertical and cross-axis stress. The calibration methodology applies off-axis loads to the aircraft structure to measure cross-axis structural response. The weight calculation techniques according to the invention use this calibration data to resolve cross-axis effects and compute actual aircraft weight from the structural bending strain data.

DESCRIPTION OF THE PREFERRED EMBODIMENT

Figure 1:
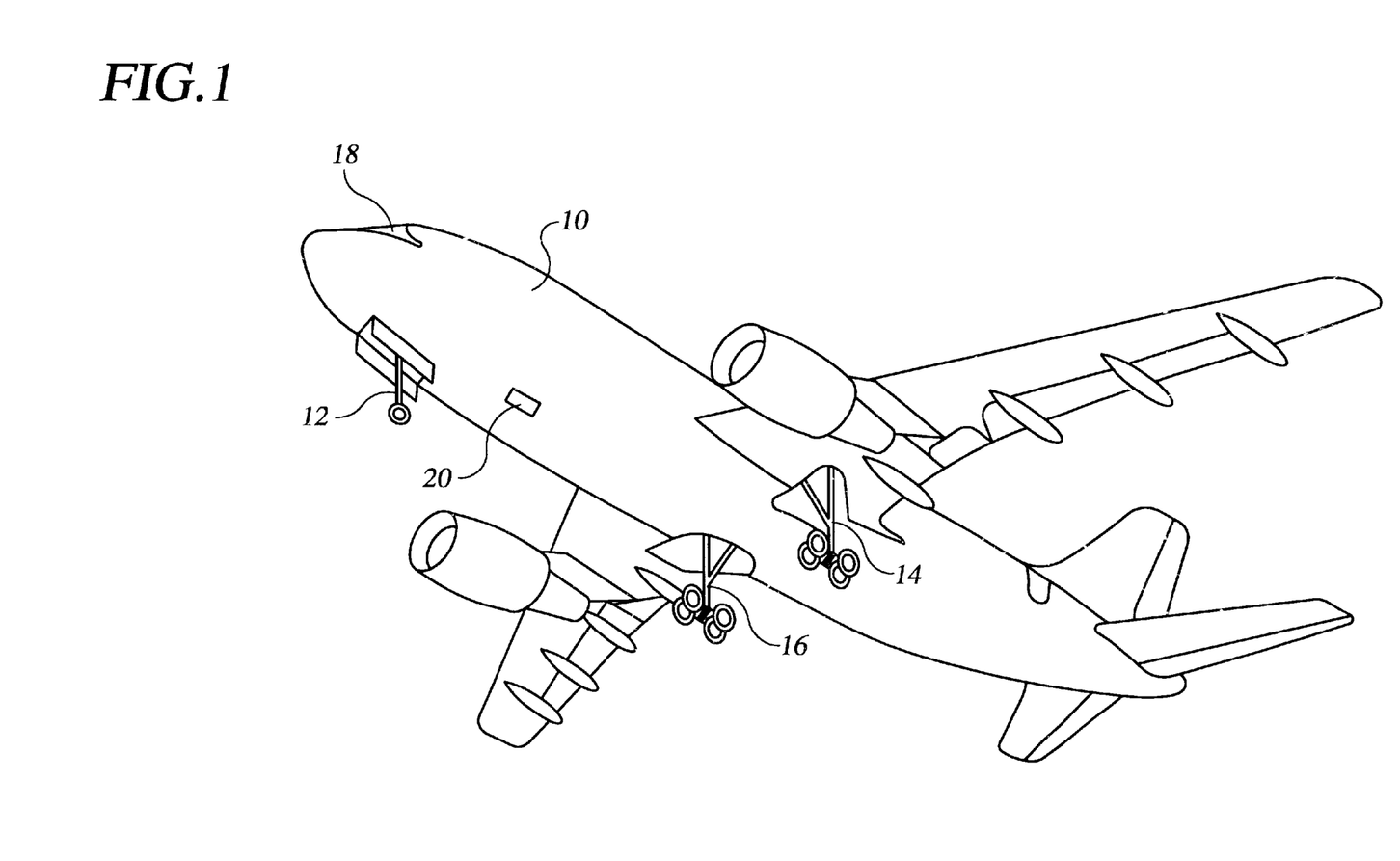
FIG. 1 is a perspective view of an aircraft illustrating distribution of the invention's system components on the aircraft.

With reference first to FIG. 1, a jet transport aircraft 10 includes nose landing gear 12, and main landing gear 14 and 16. As will be described in more detail below, the nose landinggear 12 is equipped with three load cells, each load cell including a pair of juxtaposed strain gauges for determining bending and compression. The nose landing gear 12 also includes a temperature sensor and an accelerometer along with associated filters, amplifiers, converters and transmitters. Similarly, each main landing gear 14 and 16 is equipped with three load cells (having two strain gauges each) plus a temperature sensor and an accelerometer and associated filters, amplifiers, converters and transmitters. The aircraft 10 may also include a cockpit computer display and keyboard 18. An external computer display and keyboard 20 may also be provided on an underside portion of the aircraft 10.

Figure 2:
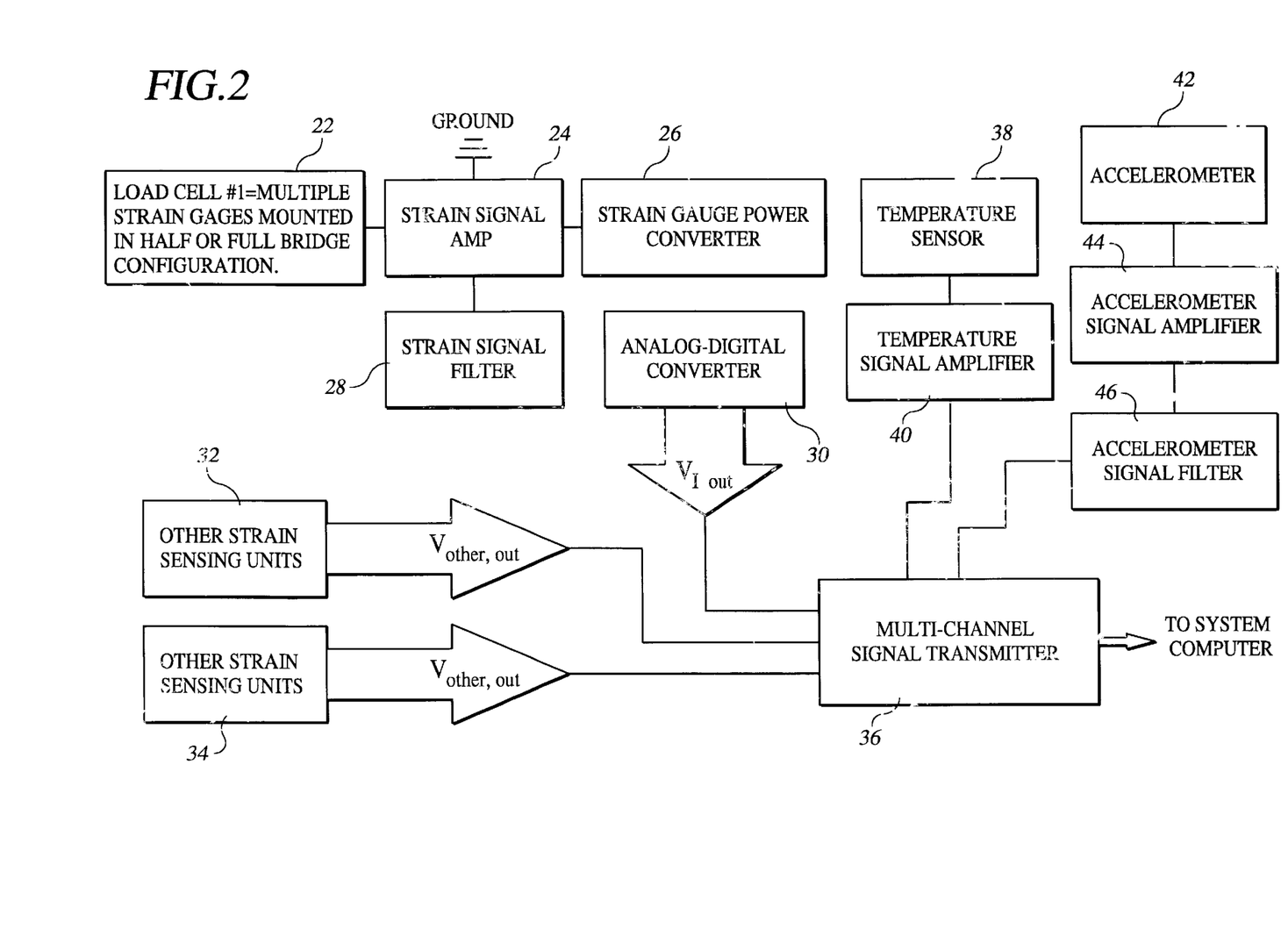
FIG. 2 is a block diagram of a schematic of the invention's strain, temperature and acceleration sensors and associated components combined in series into sensing units.

FIG. 2 is a schematic block diagram showing the strain, temperature and acceleration sensors and associated components combined in series into sensing units. These sensors may be attached to the bogie beams, axles, wingspars, fuselage, or any other structural members of the aircraft 10. A load cell 22 generates a signal which is amplified in a strain signal amplifier 24. A strain gauge power converter 26 powers the strain signal amplifier 24. The signal from the strain signal amplifier 24 is filtered in a strain signal filter 28 and is processed by an analog-to-digital converter 30 to produce a first voltage signal $V_{1\ out}$. Additional strain sensing units 32 and 34 similarly generate output signals $V_{other,\ out}$. These signals are introduced into a multi-channel signal transmitter 36. A temperature sensor 38 generates a signal which is amplified by a temperature signal amplifier 40 and is also input into the multi-channel signal transmitter 36. An accelerometer 42 generates a signal which is amplified in an accelerometer signal amplifier 44 and filtered in an accelerometer signal filter 46 and also forms of input to the multi-channel signal transmitter 36. The output of the multi-channel signal transmitter 36 goes to a system computer 48 (not shown in FIG. 2; see FIG. 3 below).

Figure 3:
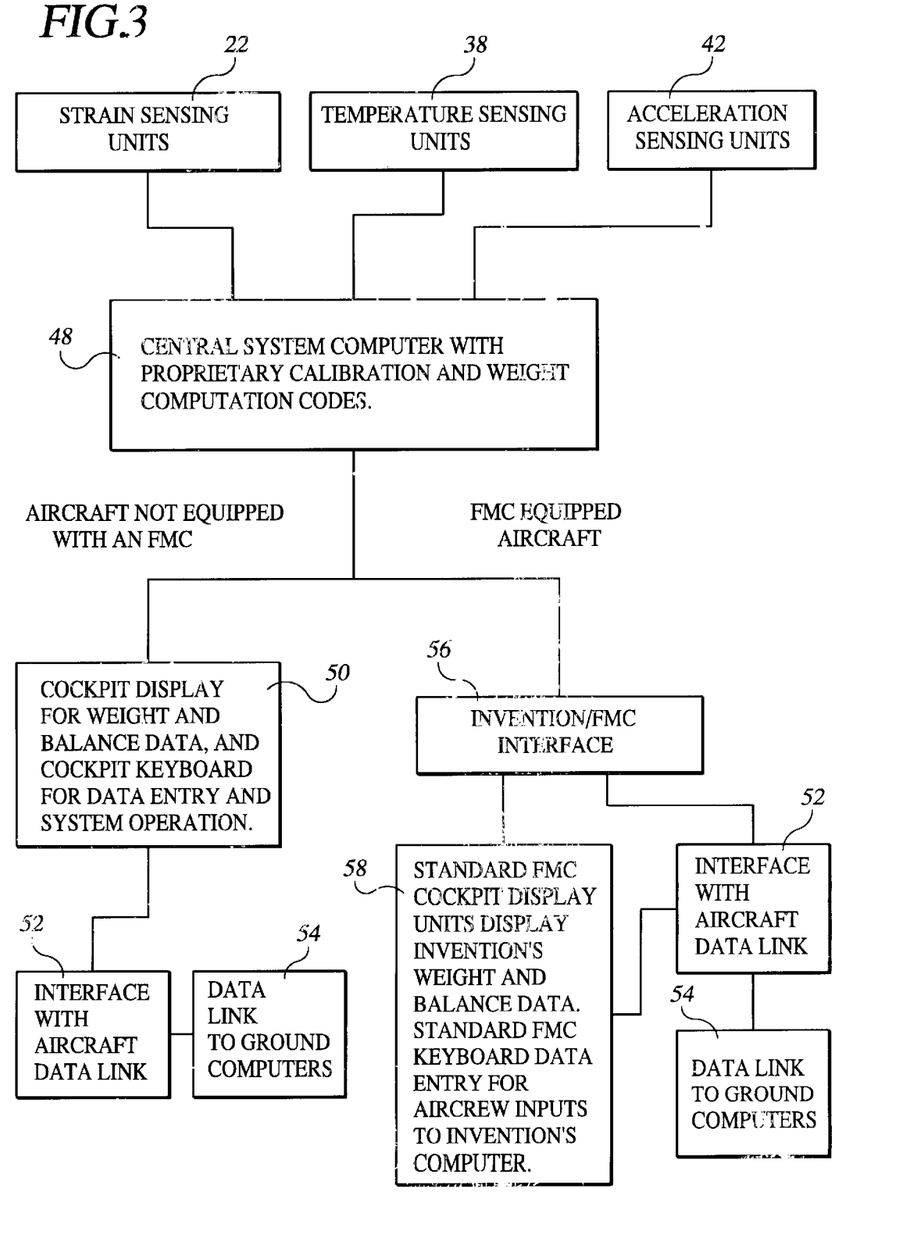
FIG. 3 is a block diagram flow chart illustrating differences in system components for aircraft equipped with flight management computer systems as compared to those that are not equipped with such systems.

With reference now to FIG. 3, the outputs of the load cell or strain sensing units 22, temperature sensing units 38 and acceleration sensing unit 42 form the input to a central system computer 48 which performs the calibration and weight computation methodologies of the invention. For an aircraft not equipped with a flight management computer (FMC), the output of the central system computer 48 is applied to a cockpit display 50 and then to an aircraft data link interface 52 and to a data link 54 to ground computers (not shown). If the aircraft is equipped with an FMC, the signal from the central system computer 48 is applied to an FMC interface 56 and on to an FMC cockpit display 58. The signal from the FMC interface 56 also is applied to the aircraft data link interface 52 for the data link 54 to ground computers. When an aircraft is equipped with an FMC, the system of the invention utilizes the FMC cockpit display equipment.

Figure 4:
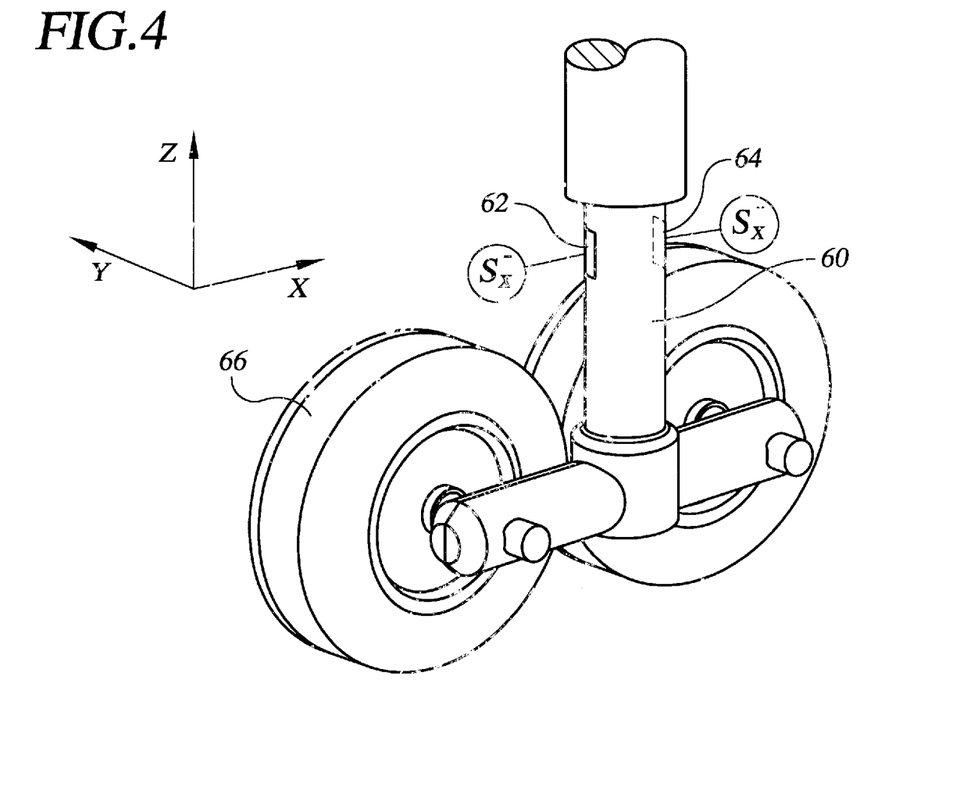
FIG. 4 is a perspective view of a vertical landing gear strut including two strain gauges to measure horizontal loads in the x-direction.
Figure 5:
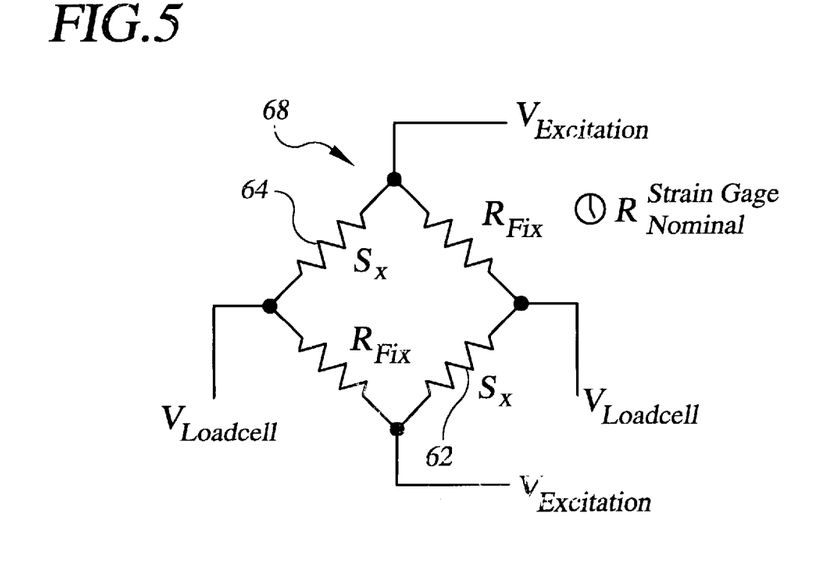
FIG. 5 is a circuit diagram of a half bridge strain gauge circuit for use with the strain gauges shown in FIG. 4.

In FIG. 4, a vertical landing gear strut 60 includes juxtaposed strain gauges 62 and 64. As will be, appreciated, the strain gauges 62 and 64 will measure loads in the horizontal x direction which is the direction of rolling of the tires 66. As shown in FIG. 5 the strain gauges 62 and 64 form part of a half bridge strain gauge circuit 68. Those skilled in the art will appreciate that the output of the half bridge circuit 68 will be proportional to the bending of the strut 60.

Figure 6:
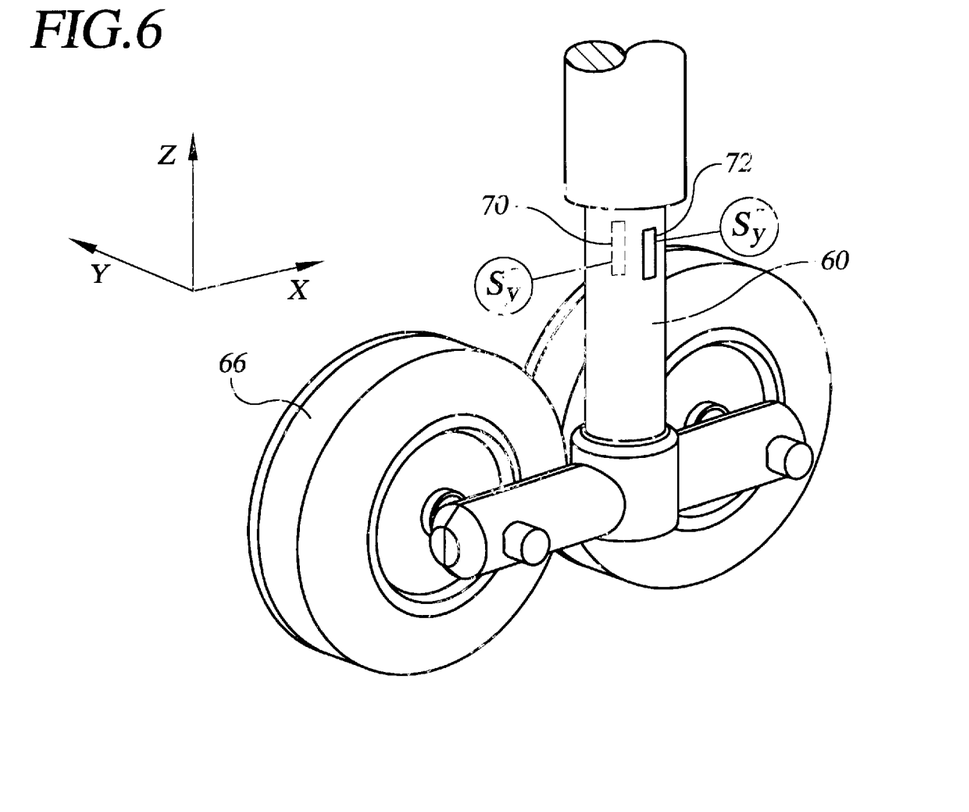
FIG. 6 is a perspective view of a vertical landing gear strut including two strain gauges to measure side loads in the y-direction.
Figure 7:
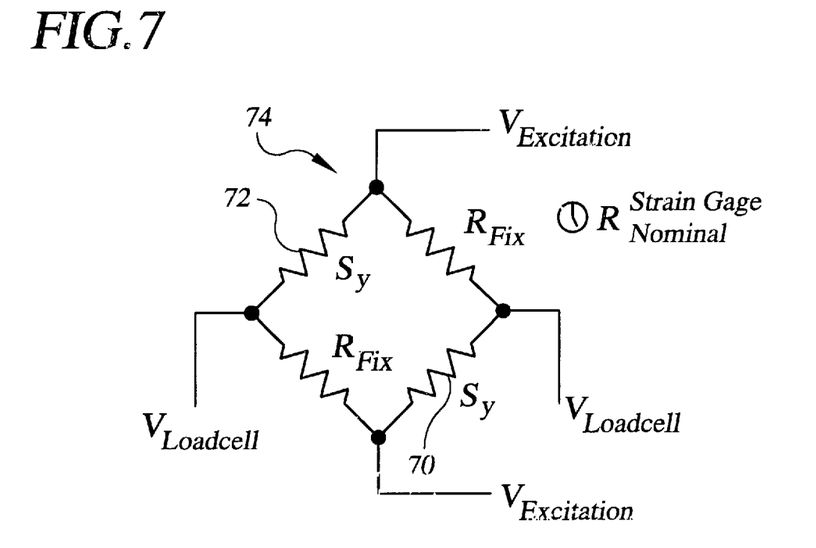
FIG. 7 is a circuit diagram for a half bridge strain gauge circuit for use in conjunction with the strain gauges in FIG. 6.

Similarly, as shown in FIG. 6, the landing strut 60 includes a pair of strain gauges 70 and 72 mounted to respond to bending in the horizontal y direction so as to respond to side loads. It is noted that the strain gauges 62 and 64 in FIG. 4 will be most sensitive to loads in the x direction but will respond to loads in other directions. Similarly, the strain gauges 70 and 72 in FIG. 6 will be most sensitive to loads in the y direction but will respond to other loads. The strain gauges 70 and 72 form arms in a half bridge strain gauge circuit 74 as shown in FIG. 7.

Figure 8:
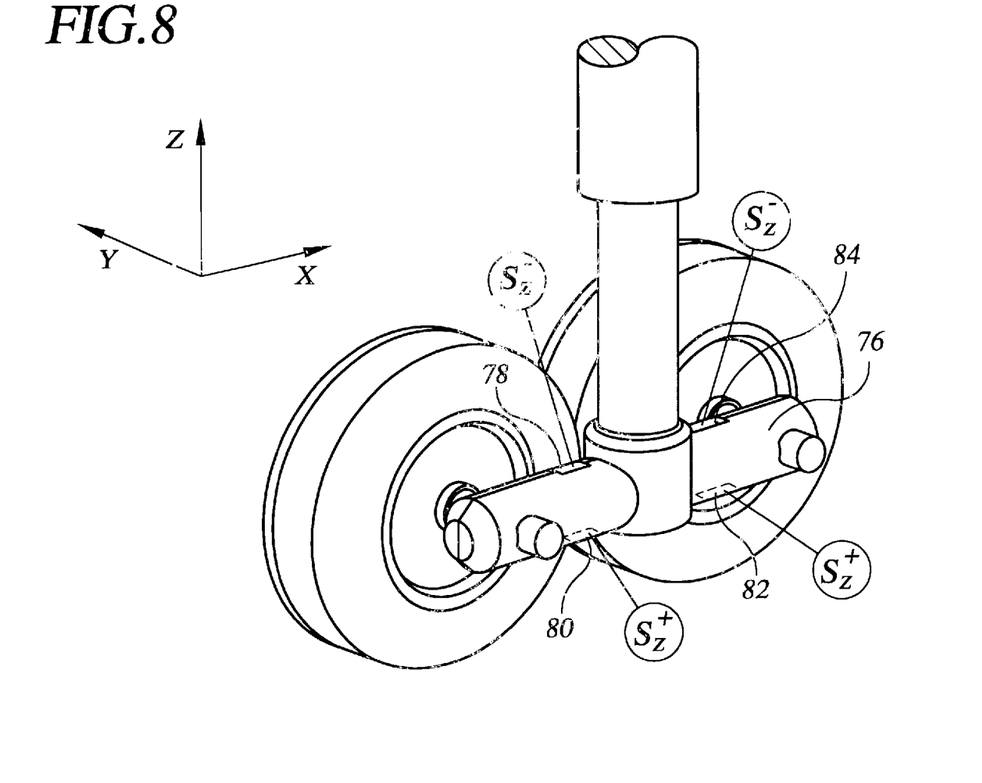
FIG. 8 is a perspective view of a landing gear bogie beam including four strain gauges to measure vertical loads in the z-direction.
Figure 9:
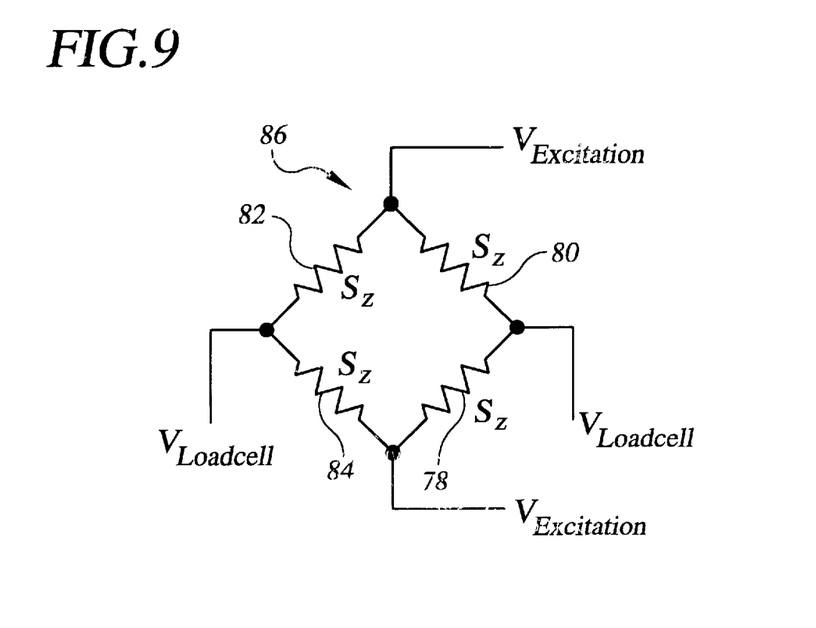
FIG. 9 is a circuit diagram of a full bridge strain gauge circuit for use in conjunction with the strain gauges in FIG. 8.

With reference to FIG. 8, a landing gear bogie beam 76 is instrumented with four strain gauges 78, 80, 82 and 84. As shown in FIG. 9, the strain gauges 78, 80, 82 and 84 are part of a full bridge strain gauge circuit 86 which will measure vertical loads in the z direction. As with the earlier discussion, the load cells placed as shown in FIG. 8 will be most sensitive to loads in the z direction but will respond to other loads as well.

Figure 10:
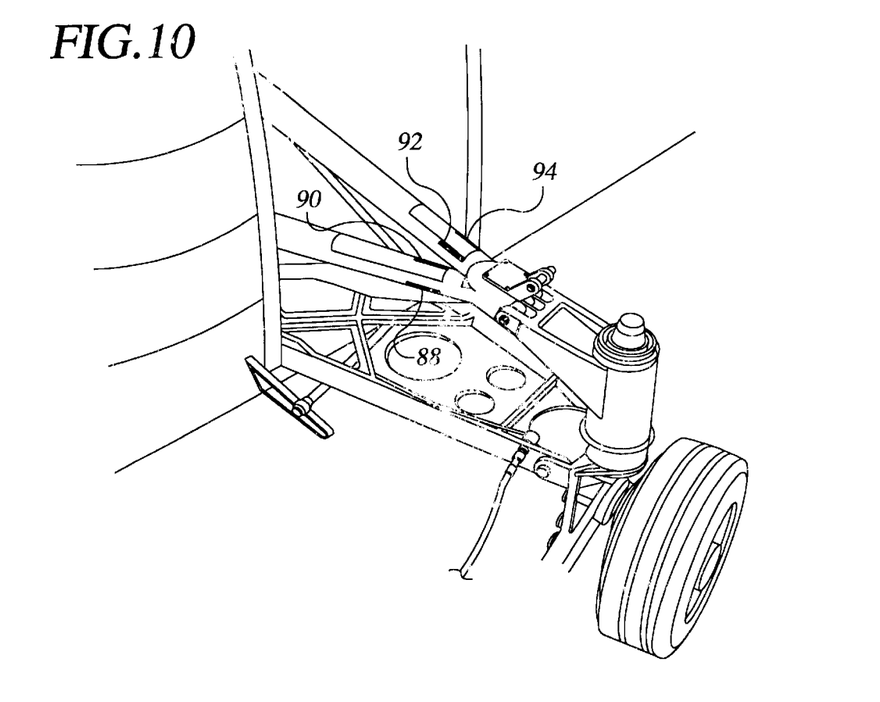
FIG. 10 is a perspective view of the right main landing gear of an Agusta 109 helicopter with suitable strain gauge locations.
Figure 11:
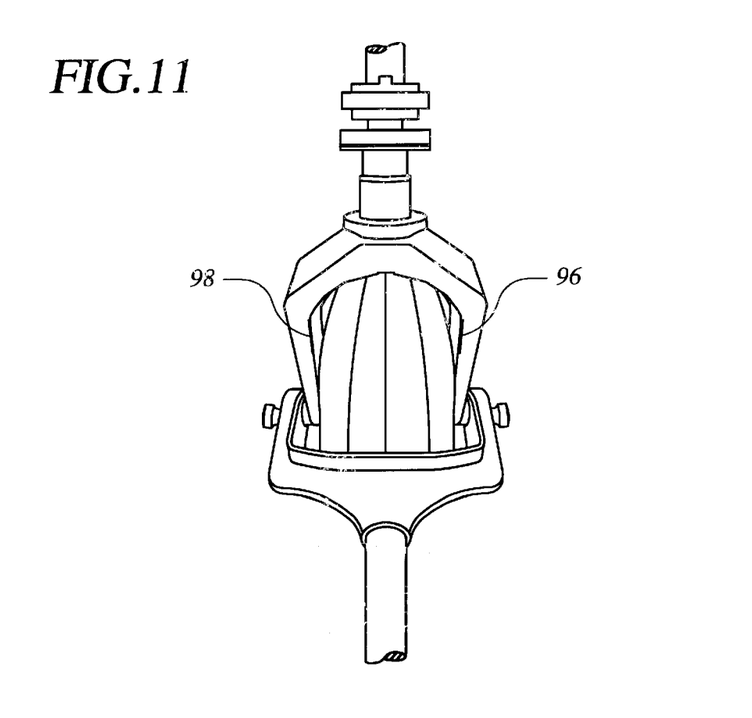
FIG. 11 is a perspective view of the nose gear of an Agusta 109 helicopter showing strain gauge locations.
Figure 12:
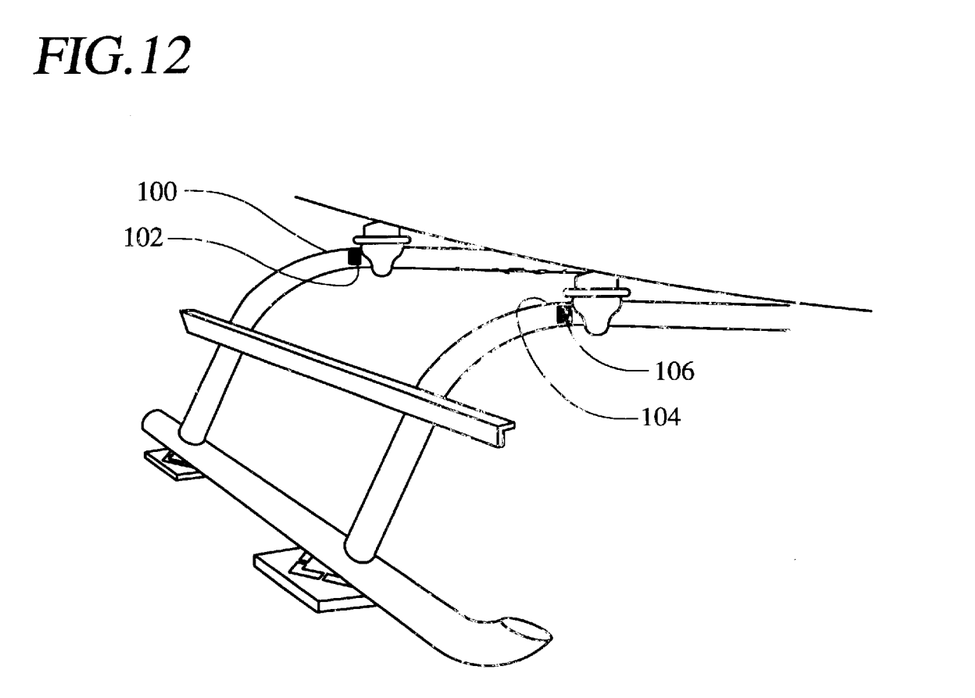
FIG. 12 is a perspective view of landing skids of a Bell Jet Ranger helicopter illustrating suitable strain gauge locations.

The present invention is also applicable to rotary wing aircraft and FIG. 10 shows strain gauges 88, 90, 92 and 94 mounted in full bridge configuration to the right main (retractable) landing gear of an Agusta 109 helicopter. FIG. 11 shows strain gauges 96 and 98 mounted on the nose gear of an Agusta 109 helicopter. FIG. 12 illustrates strain gauges 100, 102, 104, 106 mounted on the landing skids of a Bell Jet Ranger helicopter for measuring load in a full bridge configuration. It should be emphasized that the load cell positions are exemplary and that the load cells are located throughout the aircraft structure so as to make independent strain measurements. The structural members on which the load cells are mounted tend to bend, twist and rotate under the stress of supporting the aircraft's load so that these measurements can not be truly orthogonal as they each reside in their own (movable) reference frame.

As discussed above, this invention includes a plurality of strain gauges, temperature sensors, accelerometers, associated power supply units, filters, analog-digital converters, multi-channel signal amplifiers, data transmission circuits, computers, cockpit displays, ground displays, and specially designed computer software programs. The system is designed to sense forces acting on aircraft structure (including the landing gear) and to communicate this data to the central system computer 48. The system computer 48 converts the sensory data into highly accurate weight and balance information by application of the invention's calibration methodology. The computer then transmits the computed weight and balance information to the cockpit, to the subject aircraft's Flight Management Computer (if so equipped), and to the aircraft operator's ground computers.

The Flight Management Computer (FMC) system is utilized to display the invention's weight and balance information to the aircrews.

For aircraft not equipped with FMC's, the invention's computer transmits weight and balance data via electronic signal to cockpit display units and to the aircraft operator's ground staff (to include load agents, operations staff and/or dispatchers, via a radio data-link).

Again as shown in FIG. 2, the invention's sensing mechanisms include a plurality of strain gauges mounted in configurations (half and full bridge, Wheatstone bridge, and other configurations in accordance with standard engineering practice) so as to minimize sensitivity to temperature fluctuations and maximize sensitivity to desired stress measurements. Each of these strain gauge bridges is connected to a strain gauge signal amplifier 24, to the required power converter 26, and to an electronic ground (voltage=0). The signal amplifier connects in series to an analog filter 28, an analog-digital converter 30 and to a multichannel data transmitter 36. The combination of strain gauges mounted in full bridge configuration, is called a strain sensing unit or a load cell 22.

A temperature sensor/transducer 38 is mounted in close proximity to each strain gauge bridge. The temperature sensor is connected to a temperature sensor signal amplifier 40, and then to either its own multichannel data transmitter or to the local load cell multichannel data transmitter 36.

An accelerometer 42 is mounted on the aircraft structure. It is connected in series to an accelerometer power converter, an accelerometer signal amplifier 44, and an accelerometer signal filter 46, and finally to the signal transmitter 36.

The invention mounts strain sensing units in independent positions directly on the subject aircraft's landing gear, on the wing spars, or on other components of the aircraft's supporting structure in order to resolve cross-axis forces. An individual strain measurement is considered to be independent if that measurement can not be duplicated by a scaled superposition of other measurements:

$$V_\lambda \neq aV_\alpha + bV_\beta + cV_\chi + \ldots + \zeta V_\zeta$$

The number of strain sensing units installed on a subject aircraft is determined by the size and complexity of the subject aircraft. The most simple general aviation aircraft designs may require as few as three permanent strain sensing units. Complex jet transport type aircraft may require three times as many strain sensing units as the aircraft has landing gear struts.

The invention transmits sensory data from the strain sensing units to a central system computer 48 (FIG. 3) using standard engineering practices. Each multichannel data transmitter is connected to the system's central computer 48 by a transmission mechanism that facilitates the transfer and reception of multiple electronic signals. The transmission mechanism may be a wire circuit, a radio, a laser, or an infrared device. The system computer 48 accepts bending strain data and uses the invention's weight calculation algorithms to compute highly accurate aircraft weight and balance information. The specifics of system calibration and weight computation are discussed below.

The manner in which the invention displays aircraft weight and balance information depends on the information system configuration of the individual aircraft.

In aircraft that are equipped with Flight Management Computers (FMC's), weight and balance information is transmitted directly from the invention's computer to the aircraft's FMC via an FMC interface 52. The FMC may subsequently use the invention's weight and balance information to compute aircraft takeoff and flying performance data. The FMC presents both weight and flight data to air and ground crews using cockpit display units and data link equipment already installed as part of the aircraft's original FMC system.

In aircraft not equipped with FMC systems (which is a majority of older transports, and most general aviation aircraft), the invention includes electronic display units 58 in the cockpit as well as optional exterior electronic display units 20 (FIG. 1) that are accessible by ground crews. A computer keypad for computer inputs is co-located with both cockpit and optional ground display units. Computed weight and balance information is transmitted by wire circuitry to the cockpit display unit, to the ground-accessible display unit, and to a radio data link via a data link interface.

The invention's unique calibration procedure measures aircraft structural response to horizontal, vertical and cross-axis stress by placing tensioning devices between landing gear struts and then applying axial and cross-axial loads. Calibrated load cells included in the tensioning devices measure the applied tension, while the invention's strain sensors record aircraft structural response to the applied forces.

This procedure allows a more complete specification of the relationship between strain sensor output and the actual forces that act on both the landing gear and the aircraft structure, and thus makes possible a more accurate calculation of aircraft weight and balance.

Figure 13:
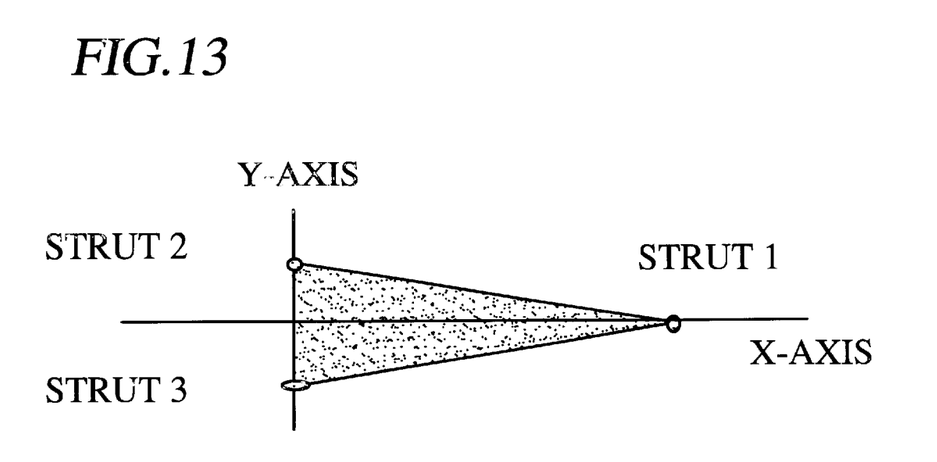
FIG. 13 is a schematic view of three load bearing struts.

In an example of a calibration procedure, the subject aircraft is assumed to have three landing gear struts as shown in FIG. 13. Each strut is instrumented with a set of four strain gauges mounted in full-bridge configuration for sensing z-axis bending strain in the strut's axle or bogie beam. Six other sets of strain gauges in full-bridge configuration are mounted throughout the aircraft structure, and are placed so that each measurement is independent of any other measurement or any combination of other measurements. The subject aircraft is devoid of fuel, passengers, maintenance items, service items, ordnance, and any other form of payload. Platform weighing scales are available to provide accurate measurements of the total weight borne by each landing gear strut.

In the aircraft's Cartesian coordinate system, the x-axis runs parallel to the aircraft's longitudinal axis, from the nose landing gear through a point equidistant between the two main landing gear. The y-axis runs perpendicular to the x-axis, and is tangential to the main landing gear. The z-axis runs in the vertical through the intersection of the x and y-planes, and defines the weight vector. The zero point (0, 0, 0) is the intersection of these three axes.

The aircraft is stationary, and experiences zero net force in the horizontal plane and zero moment around any z-axis. This initial condition of static equilibrium can be summarized mathematically as:

$$F_x^{(1)} + F_x^{(2)} + F_x^{(3)} = 0 = \sum_{i=1}^{3} F_x^{(i)} \qquad \text{eqn. (1)}$$

$$F_y^{(1)} + F_y^{(2)} + F_y^{(3)} = 0 = \sum_{i=1}^{3} F_y^{(i)}$$

$$x_{(1)}F_y^{(1)} + y_{(2)}F_x^{(2)} + y_{(3)}F_x^{(3)} = 0 = \sum_{i=1}^{3} M_z^{(i)}$$

$F_x^{(i)}$ is the x-direction force experienced by landing gear strut number "i", and $M_z^{(i)}$ is the z-moment about the "i th" strut. In matrix form, eqn. (1) is $$\begin{bmatrix} 1 & 0 & 1 & 0 & 1 & 0 & 0 & 0 & 0 \\ 0 & 1 & 0 & 1 & 0 & 1 & 0 & 0 & 0 \\ 0 & x_{(1)} & y_{(2)} & 0 & y_{(3)} & 0 & 0 & 0 & 0 \end{bmatrix} \begin{Bmatrix} F_x^{(1)} \\ F_y^{(1)} \\ F_x^{(2)} \\ F_y^{(2)} \\ F_x^{(3)} \\ F_y^{(3)} \\ F_z^{(1)} \\ F_z^{(2)} \\ F_z^{(3)} \end{Bmatrix} = \begin{Bmatrix} \sum_{i=1}^{3} F_x^{(i)} = 0 \\ \sum_{i=1}^{3} F_y^{(i)} = 0 \\ \sum_{i=1}^{3} M_z^{(i)} = 0 \end{Bmatrix} \qquad \text{eqn. (2)}$$

This important result (eqn. (2)) states that forces in the "x" and the "y" directions do exist but that the sum of these forces, for a stationary aircraft resting on its landing gear, is zero. It is useful to rewrite eqn. (2):

$$\begin{Bmatrix} F_x^{(1)} \\ F_y^{(1)} \\ F_x^{(2)} \end{Bmatrix} = -\begin{bmatrix} 1 & 0 & 1 \\ 0 & 1 & 0 \\ 0 & x_{(1)} & y_{(2)} \end{bmatrix}^{-1} \begin{bmatrix} 0 & 1 & 0 & 0 & 0 & 0 \\ 1 & 0 & 1 & 0 & 0 & 0 \\ 0 & y_{(3)} & 0 & 0 & 0 & 0 \end{bmatrix} \begin{Bmatrix} F_y^{(2)} \\ F_x^{(3)} \\ F_y^{(3)} \\ F_z^{(1)} \\ F_z^{(2)} \\ F_z^{(3)} \end{Bmatrix}, \qquad \text{eqn. (3)}$$

which can be abbreviated as $$F_{k(3\times 1)} = C_{(3\times 6)} F_u(6\times 1). \qquad \text{eqn. (4)}$$

Having established a coordinate system and defined the aircraft's initial condition of static equilibrium, the next step is to determine the aircraft's Empty Operating Weight (EOW). This is done by towing the empty aircraft onto a set of platform weighing scales, and physically weighing the aircraft:

$$F_z^{(1)} + F_z^{(2)} + F_z^{(3)} = \sum_{i=1}^{3} F_z^{(i)} = \text{aircraft weight} \qquad \text{eqn. (5)}$$

It is now possible to conduct a series of load cases in which the aircraft's structural response to applied force is measured by the invention's strain sensing units 22. The resulting data is used to calculate aircraft weight.

Load Case (I) uses the unperturbed EOW. The aircraft is weighed on the platform scales and the strain sensor measurements are recorded:

$$(1.0)F_z^{(1)} + (1.0)F_z^{(2)} + (1.0)F_z^{(3)} = C_1^{(1)}V^{(1)} + C_1^{(2)}V^{(2)} + C_1^{(3)}V^{(3)} +$$

$$C_1^{(4)}V^{(4)} + C_1^{(5)}V^{(5)} + C_1^{(6)}V^{(6)} + C_1^{(7)}V^{(7)} + C_1^{(8)}V^{(8)} + C_1^{(9)}V^{(9)} \qquad \text{eqn. (6)}$$

The left hand side of equation (6) describes the actual aircraft weight as measured by the platform weighing scales. The $F_z^{(i)}$ term represents actual z-axis force on the "i th" landing gear as determined by weighing scales.

The right hand side of eqn (6) describes load cell measurements of the aircraft's structural response to the applied force. The $V^{(i)}$ term represents the voltage signal of the "i th" load cell. The $C^{(i)}$ term is the linear coefficient that relates strain to applied force. Subscript "I" signifies the first load case.

Load Case (II) first returns the aircraft to its EOW initial condition and then reduces the z-axis load on the nose landing gear (strut #1) by 10%, and increases the load on the left main gear landing (strut #2) by 10%. The load on the right main gear remains unchanged:

$$(0.9)F_z^{(1)} + (1.1)F_z^{(2)} + (1.0)F_z^{(3)} = \qquad \text{eqn. (7)}$$
$$C_{II}^{(1)}V^{(1)} + C_{II}^{(2)}V^{(2)} + C_{II}^{(3)}V^{(3)} + C_{II}^{(4)}V^{(4)} +$$
$$C_{II}^{(5)}V^{(5)} + C_{II}^{(6)}V^{(6)} + C_{II}^{(7)}V^{(7)} + C_{II}^{(8)}V^{(8)} + C_{II}^{(9)}V^{(9)}.$$

Load Case (III) is another z-axis weight variation. After the aircraft is returned to its initial condition and EOW, the load on the right main landing gear (#3) is increased by a factor of 10%:

$$(1.0)F_z^{(1)} + (1.0)F_z^{(2)} + (1.1)F_z^{(3)} = \qquad \text{eqn. (8)}$$
$$C_{III}^{(1)}V^{(1)} + C_{III}^{(2)}V^{(2)} + C_{III}^{(3)}V^{(3)} + C_{III}^{(4)}V^{(4)} +$$
$$C_{III}^{(5)}V^{(5)} + C_{III}^{(6)}V^{(6)} + C_{III}^{(7)}V^{(7)} + C_{III}^{(8)}V^{(8)} + C_{III}^{(9)}V^{(9)}.$$

The next series of load cases installs tensioning devices between the landing gear. Tension is applied in both the horizontal and the vertical planes. Calibrated load cells in the tensioning devices measure the applied auxiliary tension while the invention's load cells record aircraft structural response.

Load Case (IV) applies tension between the two main gear struts:

$$(1.0)F_y^{(2)} - (1.0)F_y^{(3)} = C_{IV}^{(1)}V^{(1)} + C_{IV}^{(2)}V^{(2)} + C_{IV}^{(3)}V^{(3)} + C_{IV}^{(4)}V^{(4)} + \qquad \text{eqn. (9)}$$
$$C_{IV}^{(5)}V^{(5)} + C_{IV}^{(6)}V^{(6)} + C_{IV}^{(7)}V^{(7)} + C_{IV}^{(8)}V^{(8)} + C_{IV}^{(9)}V^{(9)}.$$

Load Case (V) uses the tensioning device to apply a tension "T" between the nose landing gear (strut #1) and the left main landing gear (strut #2). This line of tension makes an angle "θ" with the x-axis, so that the tension has an effective x-axis components of $-T\cos\theta = T_x$ on the nose gear (strut #1) and $T\cos\theta = T_x$ on the left main gear (strut #2). The y-axis component of the applied tension on the nose gear is $T\sin\theta = T_y$. The y-axis component of applied tension on the left main gear is $-T\sin\theta = T_y$. Load Case (V) is defined mathematically by equation (10):

$$-T\cos\theta F_x^{(1)} + T\sin\theta F_y^{(1)} + T\cos\theta F_x^{(2)} - T\sin\theta F_y^{(2)} = \qquad (10)$$
$$C_V^{(1)}V^{(1)} + C_V^{(2)}V^{(2)} + C_V^{(3)}V^{(3)} + C_V^{(4)}V^{(4)} +$$
$$C_V^{(5)}V^{(5)} + C_V^{(6)}V^{(6)} + C_V^{(7)}V^{(7)} + C_V^{(8)}V^{(8)} + C_V^{(9)}V^{(9)}$$

Load Case (VI) uses the tensioning device to apply off-axis forces in both horizontal and vertical off-axis planes. A z-axis component is introduced when one end of the tensioning device is moved to the top of the nose landing gear (strut #1), while the other end is connected to bottom of the left main landing gear (strut #3). In the following equation (11), "θ" is again the angle between the longitudinal axis (x-axis) of the aircraft and the tension line connecting the nose landing gear (strut #1) with the left main landing gear (strut #3). The new term "φ" defines the vertical angle created by the intersection of the horizontal plane and the line of tension running from the top of the nose gear strut and to the bottom of the left gear strut. Equation (11) describes the resulting horizontal and vertical cross-axis stress and aircraft structural response:

$$-T\cos\theta F_x^{(1)} - T\sin\theta F_y^{(1)} + T\cos\theta F_x^{(2)} + T\sin\theta F_y^{(2)} - \qquad (11)$$
$$T\sin\phi F_z^{(1)} + T\sin\phi F_z^{(3)} = C_{VI}^{(1)}V^1 + C_{VI}^{(2)}V^2 + C_{VI}^{(3)}V^3 +$$
$$C_{VI}^{(4)}V^4 + C_{VI}^{(5)}V^5 + C_{VI}^{(6)}V^6 + C_{VI}^{(7)}V^7 + C_{VI}^{(8)}V^8 + C_{VI}^{(9)}V^9$$

All six load equations are assembled into matrix equation (12):

$$\begin{bmatrix} 0 & 0 & 0 & 0 & 0 & 0 & 1 & 1 & 1 \\ 0 & 0 & 0 & 0 & 0 & 0 & .9 & 1.1 & 1 \\ 0 & 0 & 0 & 0 & 0 & 0 & 1 & 1 & 1.1 \\ 0 & 0 & 0 & T & 0 & -T & 0 & 0 & 0 \\ -T\cos\theta & T\sin\theta & T\cos\theta & -T\sin\theta & 0 & 0 & 0 & 0 & 0 \\ -T\cos\theta & -T\sin\theta & T\cos\theta & +T\sin\theta & 0 & 0 & -T\sin\phi & 0 & T\sin\phi \end{bmatrix} \quad (12)$$

$$\begin{Bmatrix} F_x^{(1)} \\ F_y^{(1)} \\ F_x^{(2)} \\ F_y^{(2)} \\ F_x^{(3)} \\ F_y^{(3)} \\ F_z^{(1)} \\ F_z^{(2)} \\ F_z^{(3)} \end{Bmatrix} = \begin{bmatrix} C_I^{(1)} & C_I^{(2)} & C_I^{(3)} & C_I^{(4)} & C_I^{(5)} & C_I^{(6)} & C_I^{(7)} & C_I^{(8)} & C_I^{(9)} \\ C_{II}^{(1)} & C_{II}^{(2)} & C_{II}^{(3)} & C_{II}^{(4)} & C_{II}^{(5)} & C_{II}^{(6)} & C_{II}^{(7)} & C_{II}^{(8)} & C_{II}^{(9)} \\ C_{III}^{(1)} & C_{III}^{(2)} & C_{III}^{(3)} & C_{III}^{(4)} & C_{III}^{(5)} & C_{III}^{(6)} & C_{III}^{(7)} & C_{III}^{(8)} & C_{III}^{(9)} \\ C_{IV}^{(1)} & C_{IV}^{(2)} & C_{IV}^{(3)} & C_{IV}^{(4)} & C_{IV}^{(5)} & C_{IV}^{(6)} & C_{IV}^{(7)} & C_{IV}^{(8)} & C_{IV}^{(9)} \\ C_V^{(1)} & C_V^{(2)} & C_V^{(3)} & C_V^{(4)} & C_V^{(5)} & C_V^{(6)} & C_V^{(7)} & C_V^{(8)} & C_V^{(9)} \\ C_{VI}^{(1a)} & C_{VI}^{(2)} & C_{VI}^{(3)} & C_{VI}^{(4)} & C_{VI}^{(5)} & C_{VI}^{(6)} & C_{VI}^{(7)} & C_{VI}^{(8)} & C_{VI}^{(9)} \end{bmatrix}$$

$$\begin{Bmatrix} V_1 \\ V_2 \\ V_3 \\ V_4 \\ V_5 \\ V_6 \\ V_7 \\ V_8 \\ V_9 \end{Bmatrix} = C_{measured(6\times9)} V_{out(9\times1)}$$

In the above equation (12), $C_{measured(6\times9)}$ is the (6×9) matrix of conversion coefficients, and $V_{out(9\times1)}$ is the (9×1) column vector of strain gauge voltage output. Equation (12) can be rewritten:

$$\begin{pmatrix} 0 & 0 & 0 \\ 0 & 0 & 0 \\ 0 & 0 & 0 \\ 0 & 0 & 0 \\ -T\cos\theta & T\sin\theta & T\cos\theta \\ -T\cos\theta & -T\sin\theta & 0 \end{pmatrix} \begin{Bmatrix} F_x^{(1)} \\ F_y^{(1)} \\ F_x^{(2)} \end{Bmatrix} + \begin{bmatrix} 0 & 0 & 0 & 1 & 1 & 1 \\ 0 & 0 & 0 & .9 & 1.1 & 1 \\ 0 & 0 & 0 & 1 & 1 & 1.1 \\ T & 0 & -T & 0 & 0 & 0 \\ -T\sin\theta & 0 & 0 & 0 & 0 & 0 \\ 0 & T\cos\theta & T\sin\theta & 0 & 0 & 0 \end{bmatrix} \begin{Bmatrix} F_y^{(2)} \\ F_x^{(3)} \\ F_y^{(3)} \\ F_z^{(1)} \\ F_z^{(2)} \\ F_z^{(3)} \end{Bmatrix} =$$

$$C_{measured(6\times9)}V_{out(9\times1)}$$

which can be mercifully abbreviated into the standard form $$A_{(6\times3)}F_{k(3\times1)}+B_{(6\times6)}F_{u(6\times1)}=C_{measured(6\times9)}V_{out(9\times1)}. \quad \text{eqn. (12)}$$

The objective of the calibration exercise is the development of a set of equations that can be manipulated to compute aircraft weight on the basis of strain gauge output. The calibration procedure uses initial conditions and variational load cases to determine all the quantities in equation (12). Aircraft weight can then be calculated by reading out the strain gauge signals and solving equation (12) for $F_{u(6\times1)}$.

Recall the aircraft's initial condition of static equilibrium equations (3) and (4):

$$\begin{Bmatrix} F_x^{(1)} \\ F_y^{(1)} \\ F_x^{(2)} \end{Bmatrix} = -\begin{bmatrix} 1 & 0 & 1 \\ 0 & 1 & 0 \\ 0 & x_{(1)} & y_{(2)} \end{bmatrix}^{-1} \begin{bmatrix} 0 & 1 & 0 & 0 & 0 & 0 \\ 1 & 0 & 1 & 0 & 0 & 0 \\ 0 & y_{(3)} & 0 & 0 & 0 & 0 \end{bmatrix} \begin{Bmatrix} F_y^{(2)} \\ F_x^{(3)} \\ F_y^{(3)} \\ F_z^{(1)} \\ F_z^{(2)} \\ F_z^{(3)} \end{Bmatrix} \quad \text{eqn. (3)}$$

$$F_{k(3\times1)}=C_{(3\times6)}F_{u(6\times1)}. \quad \text{eqn. (4)}$$

Substituting equation (4) into equation (12) produces:

$$A_{(6\times3)}C_{(3\times6)}F_{u(6\times1)}+B_{(6\times6)}F_{u(6\times1)}=C_{measured(6\times9)}V_{out(9\times1)}. \quad \text{eqn. (13)}$$

$$(A_{(6\times3)}C_{(3\times6)}B_{(6\times6)})F_{u(6\times1)}=C_{measured(6\times9)}V_{out(9\times1)} \quad \text{eqn. (14)}$$

$$F_{u(6\times1)}=(A_{(6\times3)}C_{(3\times6)}B_{(6\times6)})^{-1}C_{measured(6\times9)}V_{out(9\times1)} \quad \text{eqn. (15)}$$

The "calibration matrix" is now defined as:

$$(A_{(6\times3)}C_{(3\times6)}=B_{(6\times6)})^{-1}C_{measured(6\times9)}=CalMat(6\times6) \quad \text{eqn. (16)}$$

The pertinent mathematical question about the CalMat$_{(6\times 9)}$ is: Is the entity $(A_{(6\times3)}C_{(3\times6)}+B_{(6\times6)})$ invertable with rank six? A NASTRAN finite element model was constructed and Matlab used to verify that the rank of $(A_{(6\times3)}C_{(3\times6)}+B_{(6\times6)})$ is six, and that the calibration procedure is valid.

In its operational form, the invention's computer accepts strain, temperature and acceleration sensor data. The computer corrects for variations in strain data induced by temperature or acceleration variations, and then uses equation (15) (or another, similar equation derived from the set of principles demonstrated here) to solve for the force values $F_z^{(1)}$, $F_z^{(2)}$ $F_z^{(1)}$ and $F_z^{(3)}$. From these three values, the computer calculates total aircraft weight and aircraft weight distribution. This weight and weight distribution data is then transmitted to the aircraft's cockpit displays, data link transmitters, and (in aircraft so equipped) to the aircraft's FMC for processing of take-off and flight performance information.

The following example introduces a basic calibration theory that might be used with a less complex on-board aircraft weighing system. Assume a simple on-board aircraft weighing system that uses a series of strain gauges positioned along the bogie beams and/or axles of an aircraft's landing gear that record changes in z-axis strain resulting from changes in aircraft load. A basic calibration procedure places the aircraft on a set of platform weighing scales, varies the aircraft weight and center of gravity location, and then records both the platform weighing scale output and the aircraft's structural response to the applied loads. This example uses three load cases:

Case 1: Unperturbed. The empty aircraft is placed on platform weighing scales. All weighing scale and strain gauge measurements are recorded:

$$(1.0)F_z^{(1)}+(1.0)F_z^{(2)}+(1.0)F_z^{(3)}=C_1^{(1)}V_{out}^{(1)}+C_1^{(2)}V_{out}^{(2)}+C_1^{(3)}V_{out}^{(3)}. \quad \text{eqn. (17)}$$

Case 2: Z-axis Load Variation. Aircraft is first returned to its unperturbed state. Then the z-axis force on strut #1 is increased by 10%, while the weight on the left main gear (strut #2) is decreased by 10%. Strut #3 is left unperturbed:

$$(1.1)F_z^{(1)}+(0.9)F_z^{(2)}+(1.0)F_z^{(3)}=C_2^{(1)}V_{out}^{(1)}+C_2^{(2)}V_{out}^{(2)}+C_2^{(3)}V_{out}^{(3)}. \quad \text{eqn. (18)}$$

Case 3: Z-axis Load Variation. Aircraft is first returned to its unperturbed state. Then the z-axis force on strut #1 is reduced by 10%, while the weight on the right main gear (strut #2) is increased by 10%:

$$(0.9)F_z^{(1)}+(1.0)F_z^{(2)}+(1.1)F_z^{(3)}=C_3^{(1)}V_{out}^{(1)}+C_3^{(2)}V_{out}^{(2)}+C_3^{(3)}V_{out}^{(3)}. \quad \text{eqn. (19)}$$

$V_{out}^{(i)}$ defines the strain gauge voltage output for strut "i", while "$C_j^{(i)}$" is the coefficient that relates the force applied to the beam to the strain experienced by the beam. The term $F_z^{(i)}$ is the platform weighing scale measurement of z-axis force on the "ith" strut.

The three equations (17, 18, & 19) can be combined into a matrix equation:

$$\begin{bmatrix} 1.0 & 1.0 & 1.0 \\ 1.1 & .9 & 1.0 \\ .9 & 1.0 & 1.1 \end{bmatrix} \begin{Bmatrix} F_z^{(1)} \\ F_z^{(2)} \\ F_z^{(3)} \end{Bmatrix} = \begin{pmatrix} C_1^{(1)} & C_1^{(2)} & C_1^{(3)} \\ C_2^{(1)} & C_2^{(2)} & C_2^{(3)} \\ C_3^{(1)} & C_3^{(2)} & C_3^{(3)} \end{pmatrix} \begin{Bmatrix} V_{out}^{(1)} \\ V_{out}^{(2)} \\ V_{out}^{(3)} \end{Bmatrix} \quad \text{eqn. (20)}$$

or, in abbreviated notation:

$$A_{3\times3}F_{3\times1}=C_{measured(3\times3)}V_{out(3\times1)}. \quad \text{eqn. (21)}$$

where the column vector $V_{out(3\times1)}$ represents strain gauge output signals, the abbreviation $C_{measured(3\times3)}$ represents the matrix of conversion factors, $A_{3\times3}$ is the matrix of variations in the loads, and $F_{3\times1}$ is the column vector of actual z-axis forces as measured by the platform weight scales.

The objective of all of this has been to obtain $C_{measured(3\times3)}$, the basic conversion matrix. We now rearrange equation (21):

$$F_{3\times1}=(A_{3\times3})^{-1}C_{measured(3\times3)}V_{out(3\times1)}. \qquad \text{eqn (22)}$$

Equation (22) is the basic equation for calculating aircraft weight given a system of strain gauges that sense z-axis force. All quantities—the strain gauge signal outputs ($V_{out(3\times1)}$), the conversion matrix ($C_{measured(3\times3)}$), and the inverted coefficients matrix (($A_{3\times3})^{-1}$)—are known. The unknowns are the z-axis force vectors experienced by the landing gear ($F_{3\times1}$). The procedure solves equations (22) for the z-axis forces, and thus is a basic methodology for computing aircraft weight given raw bending strain data.

This basic calibration procedure can be expanded and its accuracy enhanced by considering additional load cases. But the potential for such a system is limited, as it considers only z-axis information, and ultimately works with the same number of equations as it has unknowns.

To summarize, aircraft weighing systems described in the prior art typically measure z-axis bending or shearing strain in the landing gear, or measure hydraulic or gas pressure variations. That none of these systems are currently used by major air carriers or military customers is clear evidence that these prior art systems lack accuracy and reliability.

This invention, in contrast with those prior systems, takes a fundamentally new approach.

This invention:

measures stress induced bending strain throughout aircraft structure, applies auxiliary axial and cross-axial loads during calibration in order to identify and measure cross-axis coupling effects, and resolves the impact of cross-axis coupling effects on structural z-axis strain when computing aircraft weight.

The invention's accurate weight and balance information provides significant safety and economic advantages over current practices. This accurate information can be used in daily operations to expeditiously and correctly calculate accurate flight performance information, such as: maximum ramp weight for taxi; maximum take-off weight; weight limits for runway selection; flight control configuration (trim and flap settings); takeoff rejection speed (maximum speed to abort the takeoff); rotation speed for takeoff, engine-out safe flying speed; stopping distance required to safely reject (abort) a takeoff; adjustments to correct for snow, ice, rain, and wind; and climb limited takeoff weight.

Expeditious and correct calculation of flight performance information increases the margin of safety for take-off, reduces "load-close-out" associated delays and related expenses, and allows a restructuring of current labor intensive weight estimation procedures.

Importantly, this invention also significantly improves safety in winter operations by enabling aircrews to measure changes in aircraft weight from ice and/or snow accretion during ground operations before take-off. Current practice requires de-icing under certain weather conditions, followed by a cockpit crew member's visual inspection of the wings for signs of ice accretion. This invention provides unambiguous information on the state of ice/snow accretion on the aircraft during ground operations. The system allows the pilots to electronically monitor ice accretion while taxiing during winter operations. This is accomplished by comparing changes in actual aircraft weight with the amount of fuel burned by the engines during engine start and taxi. Any excess weight is very likely to be frozen precipitation that is accumulating on aircraft surfaces.

The invention offers tremendous economic potential for commercial operators. The invention reduces costs by eliminating the "awaiting load" aircraft delays and their associated operating costs. The invention increases potential revenue and return on aircraft investment by capturing perishable carrying capacity that is otherwise lost when inaccurate load estimates overstate actual aircraft weight.

In the case of general aviation, a simplified version of the invention holds the potential for eliminating the plethora of private crashes due to terribly wrong estimates of aircraft weight. For the first time, the private operator/pilot will have an accurate, real-time measurement of total aircraft load.

In summary, reduces risk, reduces costs and improves aircraft operational economics by providing accurate and timely weight and balance information.

It is recognized that modifications of the invention will occur to those skilled in the art and it is intended that all such modifications and variations be included within the scope of the appended claims.

What is claimed is:

1. Method for calculating aircraft weight-related data comprising:

affixing strain sensors to aircraft support structure to generate signals related to the support structure;

applying known loads including off-axis loads to the support structure to determine a calibration matrix relating loads to the strain sensor signals; and calculating the weight-related data from the calibration matrix.

2. The method of claim 1 wherein the weight-related data is aircraft weight.

3. The method of claim 1 wherein the weight-related data is aircraft balance information.

4. The method of claim 1 wherein the known loads are tension between struts.

5. System for determining aircraft weight-related data comprising:

strain sensors affixed to aircraft support struts to generate signals related to strut strain;

apparatus to apply known tension including off-axis tension to the struts;

computing apparatus to calculate a calibration matrix relating loads to the strain sensor signals and to calculate the weight-related data from the calibration matrix.

6. The system of claim 5 further including temperature sensor affixed to the aircraft support struts to generate temperature,signals for use in calculating the calibration matrix.

7. The System of claim 5 further including accelerometers affixed to the aircraft for measuring aircraft acceleration, for the purposes of measuring aircraft weight.

8. The system of claim 5 further including a flight management computer for receiving the weight-related data.

9. The system of claim 8 wherein the weight-related data is aircraft weight.

10. The system of claim 8 wherein the weight-related data is aircraft balanced information.

11. The system of claim 5 wherein the off-axis tension resolves cross-coupling effects of bending stress on the support struts.

12. The system of claim 5 wherein aircraft weight is measured so as to monitor the accretion of ice, snow, slush, other frozen or liquid precipitation onto aircraft surfaces during ground operations.

\* \* \* \* \*